April 30, 1940. J. J. HARDENBERG 2,199,175
DEVICE FOR COPYING FILMS
Filed July 16, 1937 2 Sheets-Sheet 1

INVENTOR
J. J. Hardenberg
BY
E. F. Windworth
ATTORNEY

April 30, 1940. J. J. HARDENBERG 2,199,175
DEVICE FOR COPYING FILMS
Filed July 16, 1937 2 Sheets-Sheet 2
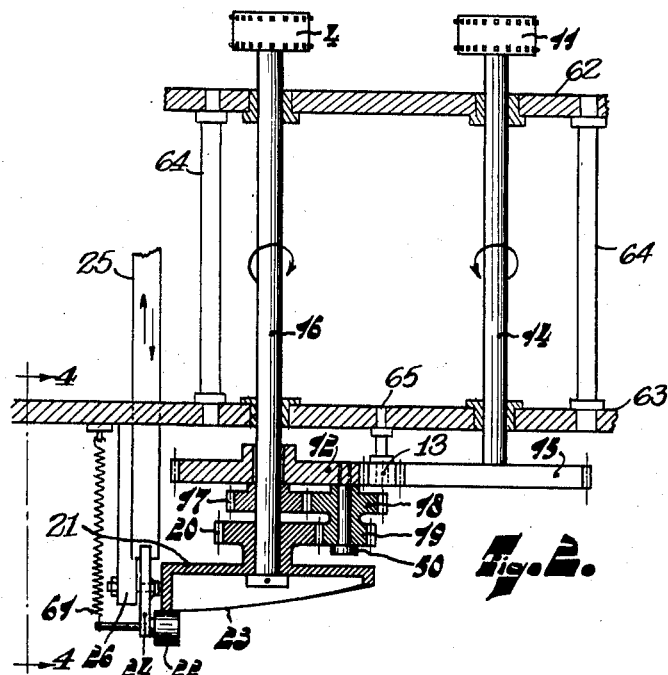
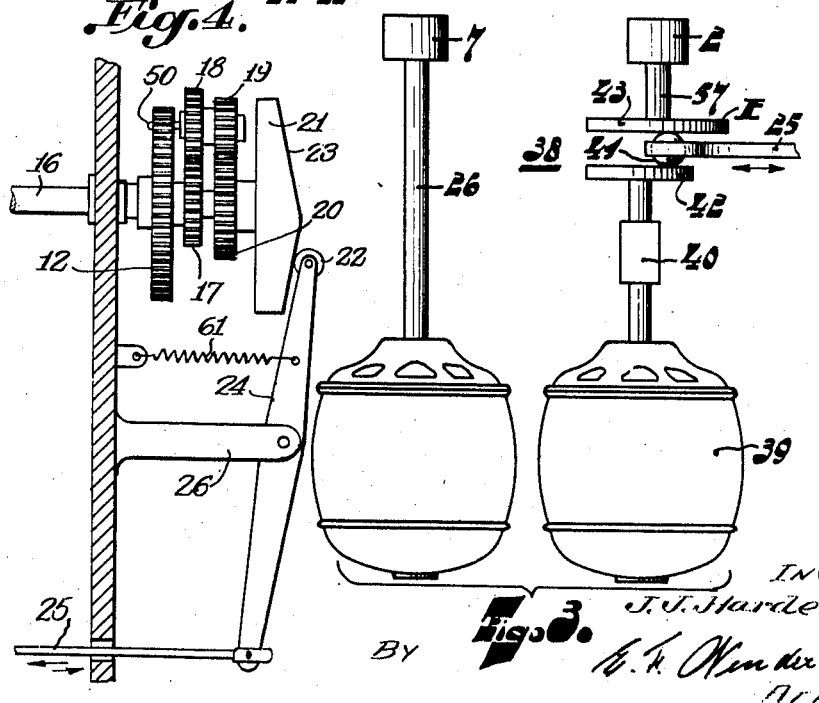
INVENTOR
J. J. Hardenberg
BY
ATTORNEY Patented Apr. 30, 1940

2,199,175

UNITED STATES PATENT OFFICE 2,199,175

DEVICE FOR COPYING FILMS

Jan Jesayas Hardenberg, Eindhoven, Netherlands, assignor to N. V. Philips' Gloeilampenfabrieken, Eindhoven, Netherlands Application July 16, 1937, Serial No. 154,111
In Germany July 20, 1936

4 Claims. (Cl. 95—75)

My invention relates to devices for copying films in which each film is independently driven without slippage by a smooth-faced roller disposed at or near the copying point.

In prior art devices of the above type, the speed of the film-driving rollers is generally controlled by electrically controlling the speed of motors which individually drive these rollers. For this purpose each film is provided with a loop and through suitable mechanical and electrical devices, the speed of the motor was varied depending upon the length of the loops, which in turn varies in accordance with the shrinkage of the films. In such constructions, however, it is necessary to drive the films by sprockets in order that the lengths of the loops will vary independently of each other, as regard to the perforation speed which has to be maintained as constant as possible by means of these sprockets. Because of this such devices do not work accurately as there is much clearance between the driving rollers of both films and in addition difficulties arise due to undesired tooth frequencies caused by the film driving sprockets.

The main object of my invention is to overcome the above difficulties and to provide a copying device which is simple in construction and accurate in operation.

A further object of my invention is to eliminate the use of film-driving sprockets at the copying point.

Further objects of my invention will appear as the description progresses.

In the device according to the invention, one film-driving roller is directly driven from a motor, whereas the second film-driving roller is driven from the shaft of said first roller through a friction-type coupling having a variable transmission ratio coupled without clearance to the shaft of said first roller, or from a second motor.

The term "directly driven" as used herein and in the claims is to be understood to include both the case in which the film-driving roller is mounted directly on the motor shaft and the case in which the roller is driven through a transmission of fixed transmission ratio from a motor whose speed differs from the required speed of the roller.

When using a single driving motor, I use a friction coupling whose transmission ratio is accurately adjustable whereby the different speeds of the roller driven thereby can be obtained in a simple manner by adjusting this ratio. If the two films are of the same length, i. e. have the same distances between sprocket holes, a fine adjustment of the transmission ratio may serve to compensate any inaccuracies which may be caused by the unsymmetrical dimensions of the coupling.

The variable transmission ratio may also be changed to compensate for the shrinkage in the films, which always occurs particularly in the negative film due to development. For this purpose I provide two sprocket wheels each driven by one of the films and which control by suitable mechanical means, the transmission ratio of the coupling. In this manner the shrinkage is automatically compensated for during the copying and as a result, copies are produced without any distortion, though the length of the negative film and the copy is different.

As a variable friction coupling I prefer to use a friction device in which a ball acts as the connecting member between a member having a constant speed and a member whose speed is to be controlled.

In order that the invention may be clearly understood and readily carried into effect, I shall describe the same in more detail with reference to the accompanying drawings in which;

Figure 2 is a partly-sectionized view of the differential driving gearing used in the device of Figure 1, Figure 3 is a plan view of a double motor driving mechanism for the device of Figure 1, and Fig. 4 is a sectional view along line 4—4 of Fig. 2.

Figure 1:
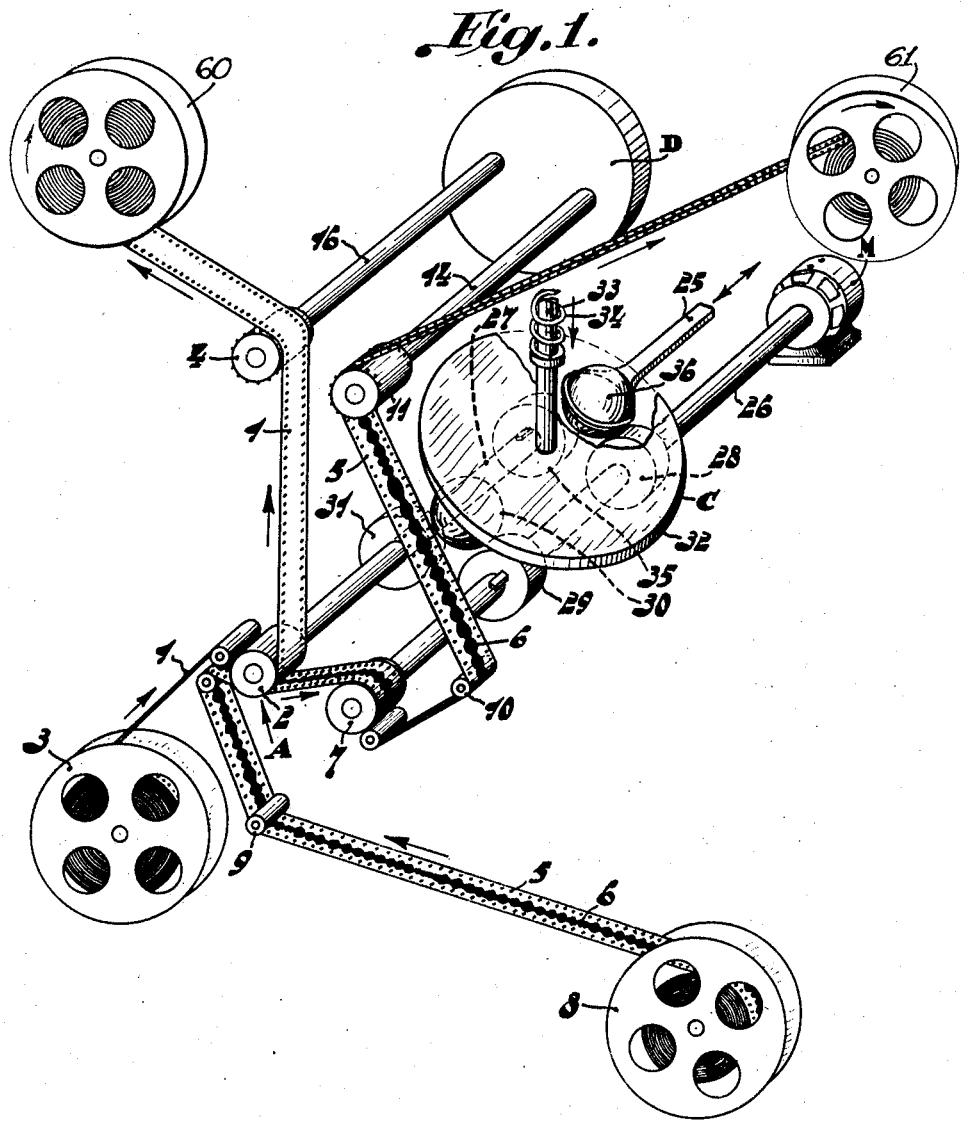
Figure 1 is a perspective schematic view of a single motor driven contact copying device according to the invention.

In the device shown in Figure 1, a positive film 1 is drawn from a reel 3 by a smooth-faced roller 2 fixedly mounted on a shaft 27 driven in a manner later to be described. Film 1 then passes in the direction of the arrow over and drives a sprocket 4 mounted on a shaft 16, after which it is wound upon a take-up reel 60. Reel 60 is driven in the direction of the arrow from the driving shaft 26 by a slipping belt (not shown). Thus, film 1 is driven by reel 60 and its velocity is controlled by the smooth-faced driving roller 2.

A negative film 5, which is shown as a pure sound film having a sound track 6, is unwound from a reel 8 by a smooth-faced roller 7 mounted on a shaft 26 driven by a motor M, and passes over a tensioning roller 9 which is mounted on a spring biased lever in well-known manner (not shown). Film 5 contacts with only a small part of film 1 which engages a large part of the periphery of roller 2. At this point of contact, which is indicated by A in the drawings, the copying operation is effected by a suitable exposure system. As such exposure systems are well known in the art, illustrations and descriptions of the same are believed unnecessary. After leaving roller 7, film 5 passes over a tensioning roller 10, and passes over and drives a sprocket 11 mounted on a shaft 14.

Film 5 is then wound upon a take-up reel 61 which is driven from shaft 26 by a slipping belt (not shown). Thus, film 5 is driven by reel 61 and its velocity is controlled by roller 7.

If the negative film 5 has shrunk, for instance because of development, it will have more perforation holes per unit of length than does film 1, which has not been shrunk to any appreciable extent. Thus, if rollers 2 and 7 move at the same speed, sprocket 11 would be rotated at a greater speed than sprocket 4. To overcome this discrepancy in the speed, I provide a differential gearing mechanism, indicated in Figure 1 by the reference letter D whereby the difference between the speeds of films 1 and 5 is converted into a rectilinear movement which, in a manner later to be described, controls the transmissions ratio of a ball coupling to thereby regulate the speed of roller 2.

The construction of the differential gearing mechanism D is shown in detail in Figures 2 and 4, which also show sprockets 4 and 11 and shafts 14 and 16. Shafts 14 and 16 are supported by suitable bearings on two plates 62 and 63 held together by rods 64. Fixed on the end of shaft 14 is a spur gear 15 engaging an intermediate gear 13 which meshes with a spur gear 12 rotatably mounted on shaft 16. Gear 13 is rotatably mounted on a stud 65 secured to plate 63.

Rotatably mounted upon a stud 50 secured to gear 12, are two gears 18 and 19 formed in one piece. Gear 18 meshes with a spur gear 17 fixed to shaft 16, whereas gear 19 meshes with a spur gear 20 rotatable upon shaft 16 and formed in one piece with a disc cam 21 having a sloping edge 23. Gears 17 and 18 are of the same diameter, whereas the diameter of gear 19 is one-half that of gear 20.

Pivoted at 26 is a lever 24 which is inclined with respect to the plane of the drawings (see Fig. 4). Lever 24 has one end secured to a member 25 (later to be discussed), and carries at its other end a rotatably mounted roller 22 pressed against edge 23 by a spring 61 acting on lever 24.

When sprockets 4 and 11 rotate at the same speed in the direction indicated by the arrows, gear 12 will be rotated through gear 13 at the same speed as gear 15 and in the same direction. Thus gears 12 and 17 rotate at the same speed in opposite directions. Gear 18 will thus rotate twice as fast as gear 17 and in the opposite direction whereby gear 19 will merely roll around gear 20 while gear 20, as well as cam 21, remain stationary.

If sprockets 4 and 11 move at different speeds, which may be due for example to shrinkage of one of the films, gear 20 and also cam 21 will be rotated, whereby roller 22 will be displaced and member 25 will be displaced either upwardly or downwardly, as indicated by the arrows. Thus it is seen that any change in the speed between rollers 4 and 11 will produce a displacement of member 25.

Referring now to Figure 1, the roller 7 rotates at the same speed as the motor M; however a suitable friction coupling C is provided between shafts 26 and 27 in order that roller 7 will rotate at the constant speed required for the copying, and that a difference between the speeds of shafts 26 and 27 can be secured to compensate for any shrinkage in the films.

Friction coupling C is of the ball type and comprises a ring 29 keyed to shaft 26, and a ring 28 rotatably mounted on shaft 26 but fixed in an axial direction, and rings 31 and 35 which are mounted on shaft 27 in a manner similar to rings 28 and 29. A ball 30 rides upon the surfaces of rings 31 and 29, whereas a second ball 36, which is held in a rotatable manner within a socket carried by member 25, rides upon the surfaces of rings 35 and 28. A disc 32 presses balls 30 and 36 against the rings 31, 29, 28, and 35, and is carried by a rotatably-mounted shaft 33 provided with a roller upon which bears a compression spring 34. In operation, ball 36 is moved toward or away from the center of disc 27 in accordance with the movement of member 25 to thus change the transmission ratio between shafts 26 and 27. In this manner the perforation speed of film 1 will be altered so as to be the same as that of film 5 regardless of any shrinkage in either of the films. It is of course possible to connect motor M to shaft 27, in which case the operation is reversed and the speed of shaft 26 is varied to equal that of shaft 27.

Instead of using a single motor, as shown in Figure 1, two constant speed motors may be used as indicated in Figure 3, in which the roller 7 is directly driven through shaft 26 from a motor 37. In this construction the friction drive device C is omitted and a friction device E is used. For this purpose roller 2 is mounted on a shaft 57 carrying a disc 43, which disc is driven through a ball 41 from a disc 42 directly driven from a motor 39. A suitable compression coupling indicated by reference numeral 40 is provided to supply the pressure between ball 41 and plates 42 and 43. The position of ball 41 and thus the speed of roller 2 is controlled by member 25 in the manner indicated in Figure 2.

While I have described the invention in connection with specific examples and applications, I do not wish to be limited thereto but desire the appended claims to be construed as broadly as permissible in view of the prior art.

What I claim is:

1. In a device for printing perforated films having different degrees of shrinkage, a film-driving mechanism comprising a supply reel and a take-up reel for each film, a plurality of smooth-faced rollers each driving one of the films, synchronous means for driving said rollers, one of the rollers being directly driven by said means, a plurality of sprockets each driven only by one of the films, and means for driving the remaining rollers from said synchronous means including a non-slipping friction-type coupling having a variable transmission ratio, and differential means associated with said coupling and sprockets to vary the transmission ratio in accordance with the difference in speeds of the sprockets.

2. In a device for printing perforated films having different degrees of shrinkage, a film-driving mechanism comprising two smooth-faced rollers each driving one of the films, a take-up reel and a supply reel for each film, two sprockets each driven only by one of the films, synchronous means for driving said rollers, one of the rollers being directly driven by said means, and means for driving the second roller from said synchronous means including a non-slipping friction-type coupling having a variable transmission ratio, and differential means associated with said coupling and sprockets to vary the transmission ratio in accordance with the difference in speed of the two sprockets.

3. In a device for printing perforated films having different degrees of shrinkage, a film-driving mechanism comprising a take-up reel and a supply reel for each film, two sprockets each driven only by one of the films, a synchronous motor, a smooth-faced roller driving one of the films and directly driven by said motor, a smooth-faced roller for driving the second film, a second synchronous motor, a non-slipping friction-type coupling connected between said second motor and second roller and having a variable transmission ratio, and differential means associated with said coupling and sprockets to vary the transmission ratio of the coupling in accordance with the difference in speeds of the sprockets.

4. In a device for printing perforated films having different degrees of shrinkage, a film-driving mechanism comprising a take-up reel and a supply reel for each film, two sprockets each driven only by one of the films, two smooth-faced rollers each driving one of the films, a single driving motor, one of said rollers being directly driven by said motor, a non-slipping friction-type coupling connected between said motor and the second roller and having a variable transmission ratio, and differential means associated with said coupling and sprockets to vary the transmission ratio of the coupling in accordance with the difference in the speeds of the sprockets.

JAN JESAYAS HARDENBERG.